T. S. WEBB, Jr.
PROCESS OF MAKING BUILDING BLOCKS.
APPLICATION FILED NOV. 19, 1920.

1,403,363.

Patented Jan. 10, 1922.
3 SHEETS—SHEET 1.

Inventor
Thomas S. Webb Jr.
By Cyrus Kehr
Attorney

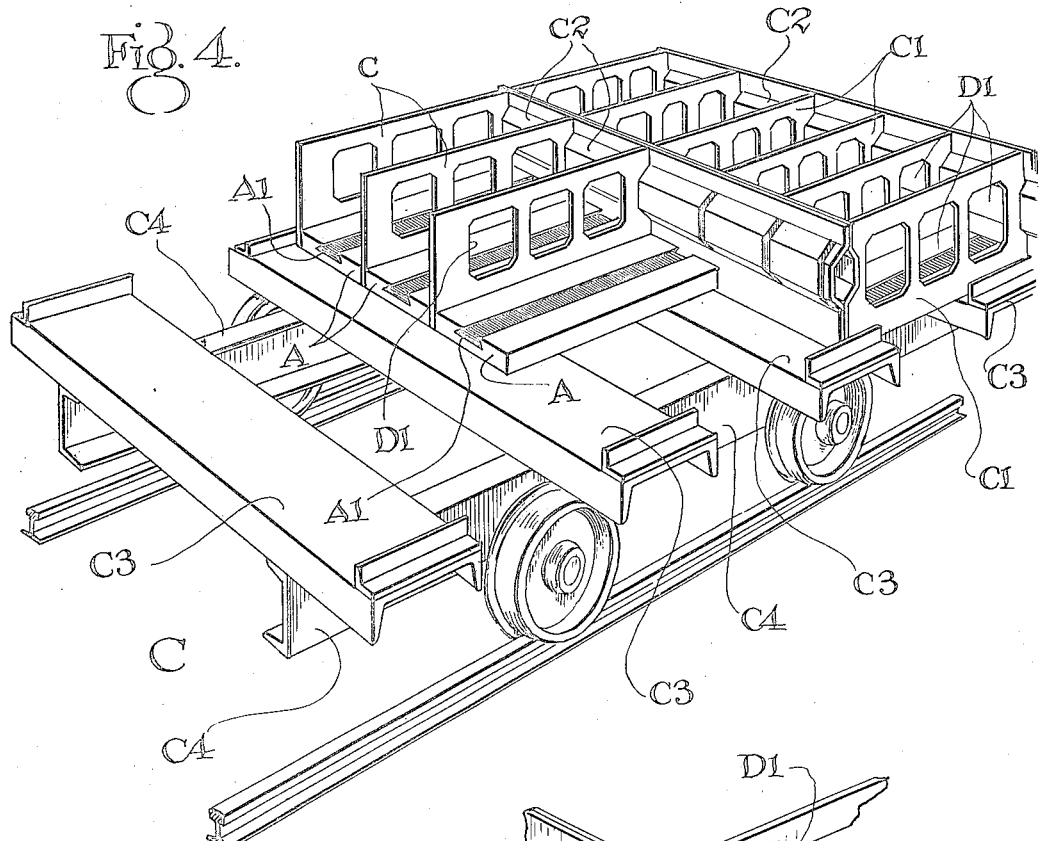
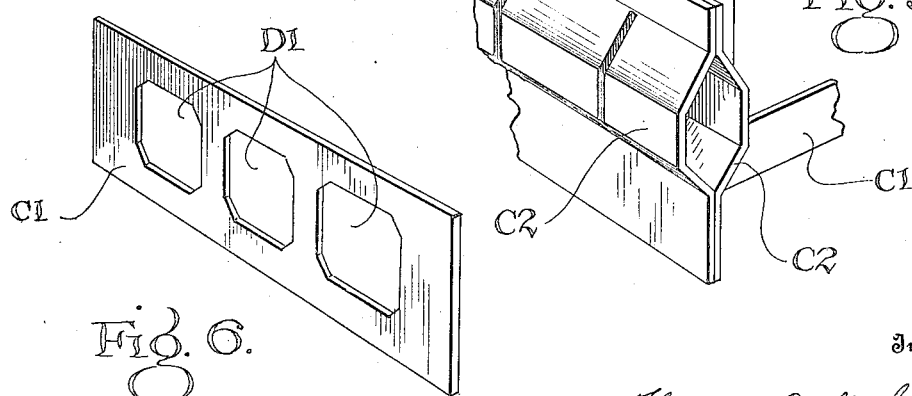

T. S. WEBB, Jr.
PROCESS OF MAKING BUILDING BLOCKS.
APPLICATION FILED NOV. 19, 1920.
1,403,363. Patented Jan. 10, 1922.
3 SHEETS—SHEET 3.
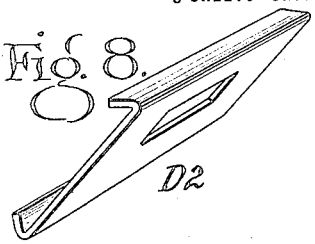
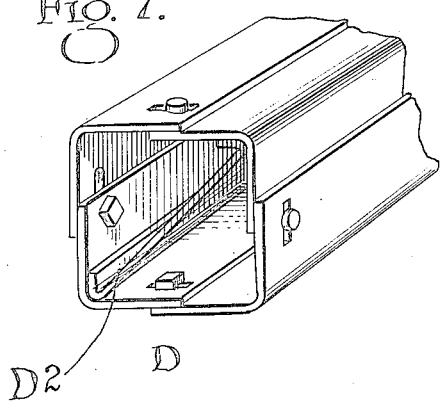
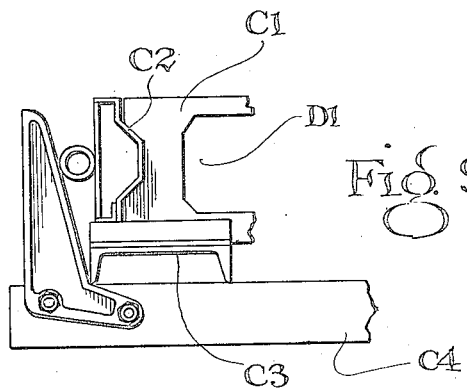
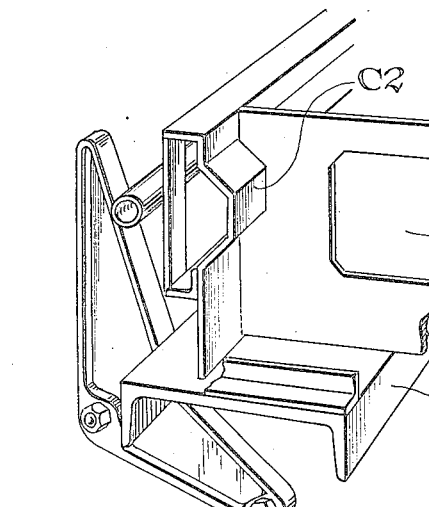
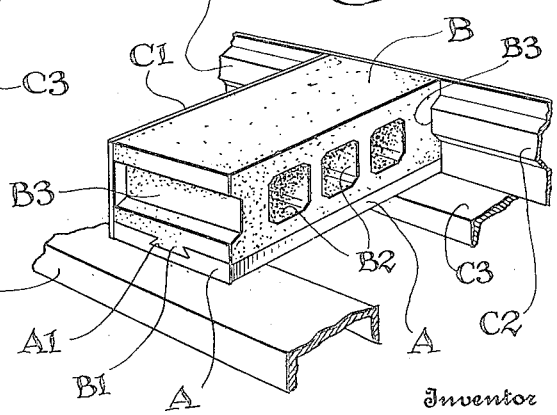
Inventor
Thomas S. Webb Jr.
By Cyrus W. Webb
Attorney

UNITED STATES PATENT OFFICE.

THOMAS S. WEBB, JR., OF KNOXVILLE, TENNESSEE.

PROCESS OF MAKING BUILDING BLOCKS.

1,403,363. Specification of Letters Patent. Patented Jan. 10, 1922.

Application filed November 19, 1920. Serial No. 425,252.

*To all whom it may concern:*

Be it known that I, THOMAS S. WEBB, Jr., a citizen of the United States, residing at Knoxville, in the county of Knox and State of Tennessee, have invented a new and useful Improvement in Processes of Making Building Blocks, of which the following is a specification, reference being had to the accompanying drawing.

My improvement relates to building blocks such as have heretofore been made of concrete mixtures.

The body of my improved block is composed of concrete and is faced with a slab of marble or other natural stone.

The object of the improvement is to provide a relatively cheap building block which has such a facing of natural stone and is adapted to produce a wall the exterior of which has the finish and quality of a wall built of entire blocks of such natural stone.

Marble and similar natural stone adapted to be used for building is found in only a comparatively few localities, while the material used for concrete has a relatively general geographical distribution. Hence there will be economy in cutting the natural stone into slabs about one inch thick and shipping them to localities where buildings are to be erected and there manufacturing the blocks each comprising a body of concrete and a slab facing.

For a mold structure suited to make my improved blocks, reference is made of United States Patent No. 1,218,737, granted to Frank Zagelmeyer, March 13, 1917.

In the accompanying drawings,

Fig. 4 is a perspective view showing a truck on which are molds of a type adapted to form my improved blocks;

Fig. 5 is a perspective detail showing the construction of the joint between the transverse and longitudinal partitions;

Fig. 6 is a perspective of one of the longitudinal partitions;

Fig. 7 is a perspective end view of one of the expansion cores;

Fig. 8 is a perspective detail of the wedge by which the cores are expanded;

Fig. 9 is a side view of the clamping device;

Fig. 10 is a fragmentary perspective view of the clamping device as seen from the side;

Fig. 11 is a perspective showing a transverse partition and a longitudinal partition and a marble slab in position relative to said partitions and the mass of concrete resting upon a part of said slab.

Figure 1:
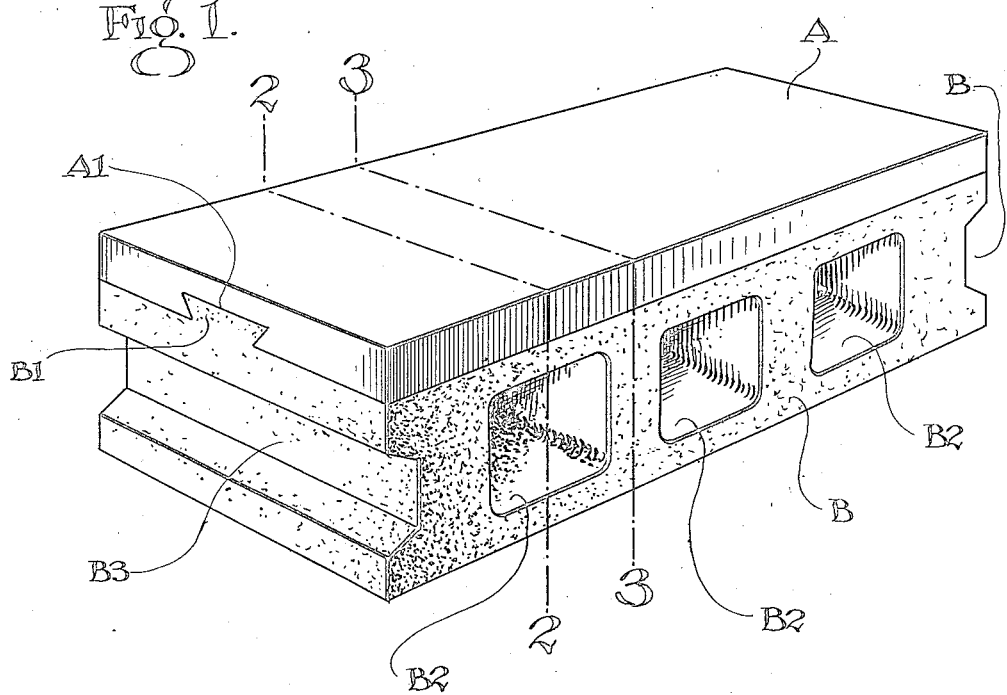
Fig. 1 is a perspective of a building block embodying my improvements.
Figure 2:
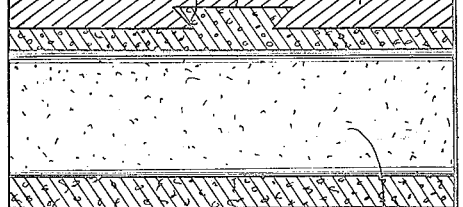
Fig. 2 is a transverse section on the line, 2—2, of Fig. 1.
Figure 3:
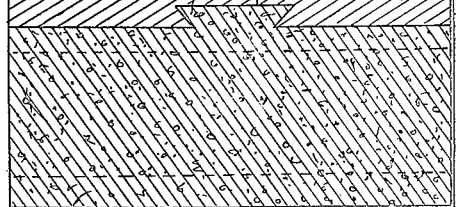
Fig. 3 is an upright transverse section on the line, 3—3, of Fig. 1.

Referring first to Figs. 1, 2 and 3, of the drawings, A is a slab of natural stone or similar material, preferably marble. The exterior face of said slab has any desired surface, either rough or finished or polished. The opposite side has a dove-tail channel, $A^2$, preferably extending lengthwise of the slab. B is the concrete body of the block. This has a concrete dove-tail, $B^1$, filling the space within the dove-tail channel, $A^1$, of the slab, A. All the faces of the body, B, which are next to the slab fit and adhere closely to the slab. The body also has transverse apertures or passages, $B^2$, the forming of which reduces the weight of the block, saves material, and makes possible the building of a chambered wall.

Referring now to the other figures of the drawings, on the truck, C, are metal side plates, $C^1$, and end metal plates, $C^2$, forming, respectively, the side walls and the end walls of the molds. The end walls are channeled, the middle part of the plates being extended inward into the mold, in order that the ends of the blocks may be indented as shown at $B^3$. Said end plates and side plates rest on horizontal cross plates, $C^3$, which rest on the longitudinal sills, $C^4$, of the truck.

In the operation of forming my improved blocks, the slabs, A, are cut to the horizontal width and length of the space enclosed by the side plates and the lower parts of the end plates. Such a slab is laid into each mold, what is to be the outer face of the finished block being turned downward and the face having the channel, $B^1$, being turned upward.

Then the cores, D, (Fig. 7) by which the apertures, $B^2$, are formed are put into place in the apertures, $D^1$, in the partitions, $C^1$. Then the cores are expanded by inserting the key, $D^2$ (Figs. 7 and 8). Thus the molds are complete, the slabs being supported by the cross plates, $C^4$, and forming supports for the semi-fluid concrete mixture. Such mixture is now poured into the mold until the latter is full to or a little above the upper edges of the side and end walls. It is preferable to then "strike" the concrete mixture with a straight edge carried along the edges of the side plates and end plates to bring the upper face of the body of mixture even with the upper edges of the walls.

By putting the marble slab below and putting the semi-fluid concrete mixture on top of the slab, gravity will press the mixture into intimate contact with all parts of the upper face of the slab.

The truck is now put into a drier in which the atmosphere is at an artificial temperature of about 150 to 200 degrees Fahrenheit; and the truck is allowed to remain in the drier until the concrete has become dried and hardened sufficiently to retain its form when taken from the truck and stacked outside the drier. At this stage the truck is taken from the drier and moved to a place for stacking or piling the blocks. Then the molds are again filled with slabs and concrete mixture.

In the drier, both the marble slabs and the concrete mixture are subjected to the artificial heat. The marble slab becomes heated and transmits heat to the portion of the concrete mixture which is in contact with the upper face of the slab. By resting the marble slabs on the cross plates, $C^3$, all of the slabs excepting the parts resting on the cross plates are exposed directly to the artificial heat of the drier. Thus the heating of the slabs is facilitated. It will be understood that it is desirable to dry the lower part as well as other parts of the concrete mass. Hence it is important that the slab be so exposed as to adapt it to transmit heat to the lower part of the mass of concrete.

In the absence of this transmission through the marble slab, the lower portion of the concrete mass—the part which is in contact with the slab—would dry slowly and thus prolong the operation and make the adhesion of the concrete to the slab uncertain.

I claim as my invention:

1. The herein described method of forming building blocks, which method consists in placing a slab of stone horizontally and then placing on said slab a body of semi-fluid concrete mixture; said slab forming the bottom wall of the mold and the weight of the mass of said concrete mixture pressing the lower part of said mass into close contact with the upper face of said slab; then subjecting said slab and mixture to a temperature substantially higher than normal atmospheric temperature until said mixture has become substantially solid and adheres to the slab, substantially as described.

2. The herein described method of forming building blocks, which method consists in placing a slab of stone horizontally and then placing on said slab a body of semi-fluid concrete mixture; said slab forming the bottom wall of the mold and the weight of the mass of said concrete mixture pressing the lower part of said mass into close contact with the upper face of said slab; then subjecting said slab and mixture to a temperature substantially higher than normal atmospheric temperature until said mixture has become substantially solid and adheres to the slab and then subjecting the block thus formed to normal temperature until the block has become seasoned, substantially as described.

In testimony whereof I have signed my name, this 8th day of November, in the year one thousand nine hundred and twenty.

THOMAS S. WEBB, Jr.